United States Patent [19]

Kempter et al.

[11] 4,188,312

[45] Feb. 12, 1980

[54] SURFACE-COATING BINDERS AND THEIR USE FOR CATHODIC ELECTROCOATING

[75] Inventors: Fritz E. Kempter, Mannheim; Eberhard Schupp, Schwetzingen; Rainer Blum, Ludwigshafen, all of Fed. Rep. of Germany

[73] Assignee: BASF Aktiengesellschaft, Fed. Rep. of Germany

[21] Appl. No.: 969,551

[22] Filed: Dec. 14, 1978

[30] Foreign Application Priority Data

Dec. 15, 1977 [DE] Fed. Rep. of Germany ....... 2755908

[51] Int. Cl.² .............. C25D 13/06; C08L 63/00; C08L 91/00
[52] U.S. Cl. ............................ 260/19 EP; 525/135
[58] Field of Search ......................... 260/831, 19 EP

[56] References Cited

U.S. PATENT DOCUMENTS

| | | | |
|---|---|---|---|
| 3,462,237 | 8/1969 | Sellet | 260/831 |
| 3,790,606 | 2/1974 | Sellet | 260/831 |
| 3,994,889 | 11/1976 | Kempter | 260/831 |
| 4,014,955 | 3/1977 | Renner | 260/831 |
| 4,086,292 | 4/1978 | Kempter | 260/831 |
| 4,134,932 | 1/1979 | Kempter | 260/831 |

FOREIGN PATENT DOCUMENTS

2357075 5/1975 Fed. Rep. of Germany .......... 260/831
2711385 9/1978 Fed. Rep. of Germany.
1457932 12/1976 United Kingdom.

Primary Examiner—Paul Lieberman
Attorney, Agent, or Firm—Keil & Witherspoon

[57] ABSTRACT

The invention relates to surface-coating binders and to their use.

The surface-coating binders, which are substantially free from epoxide groups, are based on a reaction product of (A) a Mannich base obtained from one or more polyhydric phenols which are free from ether groups and contain two or more aromatic rings, and/or one or more monohydric or polyhydric phenols which contain one or more ether groups and contain two or more aromatic rings, one or more secondary amines which contain one or two hydroxyalkyl groups and which may or may not be mixed with secondary dialkylamines or dialkoxyalkylamines, and formaldehyde or a formaldehyde donor, and (B) an epoxy resin, the reaction product of (A) and (B) additionally containing, built into its chemical structure, an olefinically unsaturated alkylphenol of the general formula (I)

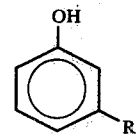

where R is a radical of 11 to 19 carbon atoms which contains from one to three carbon-carbon double bonds.

These surface-coating binders are used, especially in their protonized form, for the cathodic electrocoating of metal articles.

16 Claims, No Drawings

SURFACE-COATING BINDERS AND THEIR USE FOR CATHODIC ELECTROCOATING

The present invention relates to surface-coating binders based on reaction products of Mannich bases with epoxy resins which contain olefinically unsaturated alkylphenols built into their chemical structure, and to their use, in a protonized, water-dilutable form, as binders for cationic electrocoatings.

Binder systems for cationic electrocoatings, which contain urethane and amine groups, with or without hydroxyl groups, have been disclosed, for example in German Laid-Open Applications DOS Nos. 2,057,799, 2,165,361, 2,252,536 and 2,363,074 and in Brit. Pat. No. 1,302,328. These surface coatings show good results in respect of, inter alia, corrosion protection, throwing power or stability of the bath, but are not entirely satisfactory in respect of all properties of the binder. A substantial shortcoming of the conventional systems is, inter alia, that they cannot be used in the pH range of from 7 to 9 which is employed for anodic electrocoating. A disadvantage of these systems is that the cross-linking reactions disclosed in the said publications in some cases do not suit the desired pH range.

German Laid-Open Applications DOS Nos. 2,320,301, 2,357,075, 2,419,179 and 2,554,080 describe cationic electrocoating binders which inter alia are distinguished be very good corrosion protection, and which can be used for coating at an alkaline pH, above 7. These binders are reaction products of Mannich bases, obtained from condensed phenols, secondary amines and formaldehyde, with epoxy resins.

A disadvantage of these binders is that they cannot, in every case, be processed directly with the pigments and fillers conventionally used to prepare the surface coatings, and instead the pigments and fillers must be treated with suitable wetting agents in a preceding stage.

It is an object of the present invention to provide cationic electrocoating binders which substantially conform to requirements in respect of the essential binder properties. In particular, it is an object of the invention to provide binders which do not suffer from the above disadvantages and which can furthermore, in their protonized form, be processed in an advantageous manner with pigments and fillers in an aqueous medium.

We have found, surprisingly, that these objects are achieved by building certain olefinically unsaturated alkylphenols, preferably those derived from Cardanol, into the chemical structure of the resin.

The present invention relates to a surface-coating binder which is substantially free from epoxide groups and is based on a reaction product of (A) from 25 to 90 percent by weight of a Mannich base obtained from
  (a₁) one or more polyhydric phenols which are free from ether groups and contain two or more aromatic rings, and/or
  (a₂) one or more monohydric or polyhydric phenols which contain one or more ether groups and contain two or more aromatic rings, and
  (b₁) one or more secondary amines which contain one or two hydroxyalkyl groups, which may or may not be mixed with
  (b₂) a secondary dialkylamine or dialkoxyalkylamine, and
  (c) formaldehyde or a formaldehyde donor, and (B) from 75 to 10 percent by weight of one or more epoxy resins, wherein the reaction product of (A) and (B) additionally contains, built into its chemical structure, an olefinically unsaturated alkylphenol of the formula (I)

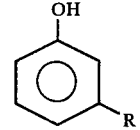

where R is a radical of 11 to 19 carbon atoms which contains from one to three carbon-carbon double bonds.

Preferred embodiments of the surface-coating binders of the invention are those where the olefinically unsaturated alkylphenol of the formula (I) is Cardanol, and those where component (a₁) is a condensation product, containing two phenolic hydroxyl groups, of a phenol and Cardanol, and/or component (a₂) is a reaction product of an epoxy resin, Cardanol, bisphenol A and a partially blocked aliphatic or aromatic diisocyanate, and/or component (B) is a reaction product, containing epoxide groups and blocked isocyanate groups, of an epoxy resin, Cardanol and a partially blocked diisocyanate or polyisocyanate. Particularly preferred surface-coating binders according to the invention are those which contain, built into their chemical structure, from 0.5 to 50% by weight of the olefinically unsaturated alkylphenol of the formula (I) or Cardanol.

The present invention further relates to the use of the surface-coating binders according to the invention, in a protonized form, for the cathodic electrocoating of metal articles.

The surface-coating binders of the invention can be processed directly with pigments and fillers conventionally employed for the preparation of surface coatings, without having to pre-treat the pigments and fillers with wetting agents. A further substantial advantage of the surface-coating binders according to the invention is that the unsaturated alkylphenols built into the chemical structure participate, by their olefinic double bonds, in the cross-linking reaction.

The following details may be noted in respect of the components from which the surface-coating binders of the invention are synthesized.

The surface-coating binders of the invention, or the components (a₁), (a₂) and/or (B) from which they are synthesized, contain olefinically unsaturated alkylphenols of the general formula (I)

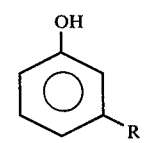

where R is a radical of 11 to 19, preferably of 13 to 17, carbon atoms, which contains from one to three, preferably two, carbon-carbon double bonds. The ethylenically unsaturated alkylphenols used according to the invention may be obtained in various ways. They are particularly easily and cheaply obtainable in the form of cashewnut-shell liquid. This is a natural product obtained from the spongy interlayer between the kernel and the shell of Anacardium occidentale. Anacardic acid, corresponding to X=H and Y=COOH in the formula

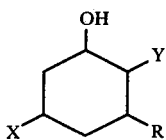

is present to the extent of about 90% in cold-extracted cashewnut-shell oil and when worked up industrially undergoes decarboxylation and is converted to Cardanol (corresponding to X=H and Y=H in the above formula). Hence, commercial cashewnut-shell oil consists predominantly of Cardanol, with minor amounts of Cardol (corresponding to X=OH and Y=H) and of polymerized material.

R is an alkylene side chain of, in the main, 13 to 17 carbon atoms and containing from 1 to 3, in the main, 2, ethylenically unsaturated double bonds. For the purposes of the invention, this commercial cashewnut-shell oil can be employed directly, but it may prove advantageous to use pure Cardanol, obtainable in up to 90% yield by distilling cashewnut-shell oil under reduced pressure. Pure Cardanol is a mixture of long-chain 3-alkylenephenols having predominantly from one to three olefinic double bonds, e.g. 3-(8,11-pentadecadienyl)-phenol.

Cardanol I has the formula

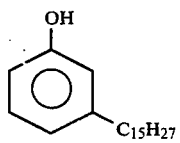

(a₁) Examples of suitable polyhydric phenols free from ether groups and containing two or more aromatic rings, which are suitable for the preparation of the Mannich base (A), are those of the general formula

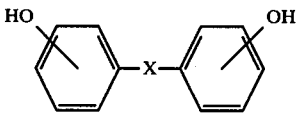

where the hydroxyl groups are in the ortho-position or paraposition to X, and X is a straight-chain or branched divalent aliphatic radical of 1 to 3 carbon atoms, or is $SO_2$, SO, O or $CH_2$—NR—$CH_2$, and R is alkyl of 1 to 6 carbon atoms or hydroxyalkyl or alkoxyalkyl; bisphenol A is preferred. However, particularly preferred components (a₁) are reaction products of phenols with Cardanol. Combinations of these reaction products with phenol or bisphenol and/or Mannich condensation products of phenol and/or an alkylphenol, a primary amine and formaldehyde, as described in German Patent Application No. P 27 11 385.5, or low molecular weight reaction products of phenols and formaldehyde, i.e. novolacs, may also be used.

(a₂) Examples of suitable monohydric or polyhydric phenols containing one or more ether groups and possessing 2 or more aromatic rings are products of the general formula HO—B—[O—E—O]$_n$—H or HO—B—[O—E—O]$_n$—P where B is

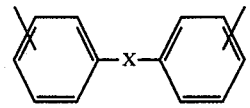

and X has the above meaning, E is a hydroxyl-containing radical which is obtained by adduct formation of an epoxide compound with a phenolic hydroxyl group, P is phenyl or an alkylphenyl radical which may or may not contain an unsaturated aliphatic group, and n is an integer from 1 to 3, preferred epoxide compounds E being epoxy resins, eg. the diglycidyl ethers of bisphenol A, pentaerythritol, glycerol, trimethylolpropane, glycol or glycol ethers or of other polyhydric, preferably dihydric to tetrahydric, alcohols.

Other suitable compounds containing epoxide groups are nitrogen-containing diepoxides, as described in U.S. Pat. No. 3,365,471, epoxy resins obtained from 1,1-methylenebis-(5-substituted hydantoin) as described in U.S. Pat. No. 3,391,097, diepoxides obtained from bisimides as described in U.S. Pat. No. 3,450,711, epoxidized aminomethyl-diphenyl oxides as described in U.S. Pat. No. 3,312,664, heterocyclic N,N'-diglycidyl compounds as described in U.S. Pat. No. 3,503,979, aminoepoxy phosphates as described in British Pat. No. 1,172,916, 1,3,5-triglycidyl isocyanurates and other materials known in the art and containing epoxide groups, eg. dicyclopentadiene dioxide, limonene dioxide and epoxidized butadiene oils. Particularly preferred components (a₂) are reaction products of diglycidyl ethers of bisphenol A or of polyhydric aliphatic alcohols, eg. pentaerythritol, trimethylolpropane and glycerol, with bisphenol A and the above olefinically unsaturated alkylphenols, eg. Cardanol, with or without phenol. Such products in general have molecular weights of from 900 to 1,800 and epoxide values of from 0.004 to 0.01 and can be prepared, for example, at from 160° to 180° C. or, in the presence of a reaction catalyst, at a correspondingly lower temperature.

Where a mixture of components (a₁) and (a₂) is employed—this being preferred per se—the weight ratio of the two components is from 1:0.1 to 1:5.

(b₁) Examples of suitable secondary amines (b₁) which contain one or more hydroxyalkyl groups are alkylethanolamines or alkylisopropanolamines, where alkyl is of 1 to 6 carbon atoms. However, dialkanolamines derived from alcohols of 2 to 6 carbon atoms, especially diethanolamine, and mixtures of such dialkanolamines with alkylalkanolamines, are preferred.

The secondary amine (b₁) which is built into the chemical structure of the Mannich base (A) as a dialkanolaminomethyl group or alkylalkanolaminomethyl group, is of critical importance in respect of the dispersibility of the binder in the desired pH range of from 7.0 to 9.0, and in respect of the crosslinking of the system.

(b₂) Suitable secondary alkylamines (b₂) which may or may not be employed together with the hydroxyalkyl-containing amines (b₁) for the preparation of the Mannich bases, are those of the general formula

where $R^1$ and $R^2$ are identical or different and each is a straight-chain or branched aliphatic radical of 2 to 10 carbon atoms, which may or may not contain an alkoxy group. Examples of suitable secondary amines of this type are di-n-butylamine, diisopropylamine, di-n-pentylamine, di-n-hexylamine, di-n-octylamine, di-2-ethylhexylamine and di-2-alkoxyethylamines, eg. di-2-methoxy-, di-2-ethoxy- and di-2-butoxy-ethylamine, as well as those where $R^1$ and $R^2$ are linked to form a ring, eg. morpholine or piperidine.

Preferred components (b₂) are di-n-butylamine, di-2-ethylhexylamine and di-n-hexylamine. The mode of action of these secondary amines (b₂) is in the main that they influence the stability of the binder, and contribute to good levelling and to the internal plasticization of the surface coatings produced with these binders. They also make some contribution to the crosslinking which occurs.

The secondary amines may inter alia also contain a proportion of primary amines, originating from the method of preparation, but their proportion should not exceed 20 percent by weight of the secondary amine. The weight ratio of components (b₁) and (b₂) may be from 1:10 to 1:0.1, preferably from 1:2 to 2:1.

(c) As formaldehyde or formaldehyde donors (c), aqueous formaldehyde solutions, solutions of formaldehyde in an alcohol, eg. butanol, or paraformaldehyde, or mixtures of these, are employed.

The Mannich base (A) is prepared in accordance with the conventional methods described in the literature (cf., for example, Houben-Weyl, Methoden der organischen Chemie, volume XI/1, page 731 (1957)), preferably by reaction at from 20° to 80° C. The ratios in which the starting materials are employed depend on the desired properties, but preferably the molar ratio of components (a₁)+(a₂) to components (b₁)+(b₂) is from 1:0.75 to 1:3. In general, however, about one mole of secondary amine is employed per phenolic hydroxyl group. The amount of (c) is at least one mole per mole of (b). It is also possible to react the olefinically unsaturated alkylphenols, eg. Cardanol, with the resins bearing Mannich groups and optionally with an excess of formaldehyde.

(B) Preferred epoxy resins (B) are polyepoxide compounds with from 2 to 3 epoxide groups per molecule, eg. reaction products of polyhydric phenols, especially those of the formula given under (a₁)

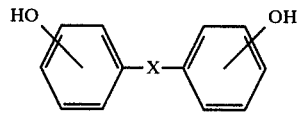

with epichlorohydrin, but also the reaction products, mentioned above, of polyhydric alcohols, eg. pentaerythritol, trimethylolpropane or glycerol, with epichlorohydrin. Other preferred epoxy resins (B) are reaction products, containing epoxide groups, of epoxy resins with secondary amines or with hydroxyl-containing glycol ethers; epoxy resins which contain heteroatoms, eg. sulfur, in their chemical structure; the epoxy resins mentioned under (a₂); and epoxy resins containing blocked urethane groups, as described in German Laid-Open Application DOS No. 2,254,080. Quite generally, all resins which contain 1,2-epoxide groups and are derived from the category of the polyacrylate, polyether, polyester and polyurethane resins, are also suitable.

For use according to the invention, the above epoxide compounds can in part be reacted with the above olefinically unsaturated alkylphenols, eg. Cardanol. For this purpose, epoxide compounds with more than 2 epoxide groups, eg. 1,3,5-tris-glycidylcyanurate, are particularly preferred.

To ensure a high functionality of component (B) necessary for resin formation from components (A) and (B), component (B) can, where appropriate, be reacted with a diisocyanate, eg. hexamethylene diisocyanate or toluylene diisocyanate, or a polyisocyanate, resulting in epoxy resins containing unsaturated groups, and having, on average, 2 epoxide groups and one or more unsaturated aliphatic radicals per molecule.

Resins of similar structure are obtained if the epoxide groups of a resin are reacted completely with the above olefinically unsaturated alkylphenols, eg. Cardanol, and crosslinking is subsequently effected with an OH-containing polyepoxide (eg. the polyglycidyl ether obtained from pentaerythritol and epichlorohydrin), via a diisocyanate.

The epoxy resins according to the invention may or may not be reacted further with partially blocked diisocyanates and polyisocyanates. This reaction can also be carried out with component (a₂). Furthermore, epoxy resins prepared from Cardanol by other methods can be employed. The products may also have air-drying characteristics. For example, epoxy resins based on Cardanol containing novalacs or based on Cardanol/phenol reaction products may be employed.

The reaction of component (A) with component (B) is in general carried out at from 20° to 100° C., preferably from 40° to 80° C., preferably in the presence of an organic solvent, eg. an alcohol or a glycol ether.

The main reaction occurring between the Mannich base (A) and the epoxy resins (B) may be assumed to be an autocatalytic etherification of the phenolic hydroxyl groups by the epoxide groups.

It is important that the reaction product obtained from components (A) and (B) should be substantially free from epoxide groups, ie. that it should contain not more than 0.3, preferably less than 0.1, epoxide group per molecule of reaction product. Advantageously, the components are reacted in such proportions as to provide from 0.1 to 0.9, preferably from 0.3 to 0.7, epoxide group of component (B) per phenolic hydroxyl group of component (A). If an excess of epoxide groups of component (B) is present, they can be eliminated, at any desired stage, by a suitable reaction, for example with an acid, an amine or, preferably, a mercaptan, eg. mercaptoethanol or dodecylmercaptan. The same effect can also be achieved by reaction with the olefinically unsaturated alkylphenols, eg. Cardanol.

The products thereby produced contain, in addition to aliphatic double bonds, diethanol-, alkylethanol- and dialkyl-aminomethyl-o-phenol end groups. In addition, they may or may not contain urethane and/or blocked urethane groups.

The amount of olefinically unsaturated alkylphenol, eg. Cardanol, is from 0.5 to 50%, calculated relative to solid resin.

The binders according to the invention are also obtained if Cardanol, or products as described in U.S. Pat. No. 2,128,427, are reacted with the binders described in German Laid-Open Applications DOS Nos. 2,320,301, 2,419,179, 2,554,080 and 2,541,801, in the presence or absence of formaldehyde.

In addition to the good properties of the binders according to the invention referred to above, the aliphatic double bonds contribute to the crosslinking, resulting in very elastic coatings.

It is possible to combine the binders according to the invention with blocked polyurethane resins based on polyols, epoxy resin derivatives etc., for example as described in German Laid-Open Application DOS No. 2,711,425.

The surface-coating binders of the invention can be diluted with conventional solvents for surface coatings, eg. isopropanol or decanol or with aqueous organic solvents and can then be applied, with or without pigments, fillers and the conventional assistants, using conventional methods of coating, eg. spraying, dipping or flooding, onto the substrate to be coated, eg. wood, metal, glass or ceramic, after which they are dried, and cured at above 150° C. The resulting coatings exhibit great hardness and solvent resistance.

The surface-coating binders are protonized with acids, eg. phosphoric acid and its derivatives or, preferably, with water-soluble carboxylic acids, eg. acetic acid, formic acid and lactic acid. The protonized surface-coating binder is water-dilutable and can be processed by conventional surface-coating methods, again giving coatings having valuable properties. The degree of protonization should be kept as low as possible.

However, the preferred use of the protonized surface-coating binders is the cathodic electrocoating of electrically conductive surfaces, for example of metal articles, eg. sheets of brass, copper, aluminum, iron and steel, which may or may not be chemically pretreated, for example phosphatized.

The aqueous solutions or dispersions of the surface-coating binders, which at least in part are in the form of a salt or a water-soluble carboxylic acid, may in addition contain other assistants which can be cathodically deposited, eg. further binders, pigments, fillers, soluble dyes, solvents, levelling agents, stabilizers, antioxidants, curing catalysts or anti-foam agents.

The resinous products of the invention may be used both as the main carrier resin for the electrocoating and as the carrier resin in the pigment paste. Alternatively, the resin can be used as the main carrier resin for the electrocoating composition, in combination with a conventional pigment paste. Furthermore, the resin can be used as the carrier resin in a pigment paste, in combination with a conventional carrier resin, containing amine groups for cathodic electrocoating. The resins, containing amine groups, which can be used for cationic electrocoating are well-known and hence do not require detailed description here. Examples of suitable resins include resins containing tertiary amine salt groups, as disclosed in German Laid-Open Application DOS No. 2,603,666, and resins containing quaternary ammonium salt groups, as described in U.S. Pat. No. 3,839,252.

For cathodic electrocoating, the solids content of the composition is in general brought to 5-20 percent by weight by dilution with deionized water. Coating is carried out at from 15° to 40° C. for from 1 to 2 minutes at a bath pH of from 6.5 to 10.2, preferably from 7.0 to 9.0, and with a deposition potential of from 50 to 500 volts. The film cathodically deposited on the electrically conductive article is rinsed and then cured at from about 150° to 200° C. for from 10 to 30 minutes, preferably at from 160° to 200° C. for 20 minutes.

The crosslinking of the binders on baking takes place not only by the reaction mentioned above (involving double bonds) but also via the alkanolaminomethyl group. Probably, the dialkylaminomethyl group also participates; the isocyanate groups of any blocked isocyanates which may be present in general contribute little to the crosslinking reaction. Instead, they take up the amines liberated on baking, a nucleophilic exchange between the amine and the blocking agent taking place. As a result, the substantially less polluting blocking agent, ie. preferably a lower aliphatic alcohol, is liberated.

The coating agents of the invention, when applied to substrates, give surface coatings having good mechanical properties, in particular good hardness and scratch resistance coupled with good elasticity and strong adhesion. The coatings also exhibit great resistance to solvents and particularly high resistance in the salt spray test.

In the text which follows, and in the Examples, parts and percentages are by weight.

Preparation of component ($a_2$) (I):

525 parts of a glycidyl ether based on pentaerythritol (epoxide value 0.57–0.6) and 294 parts of Cardanol are heated for 30 minutes at 180° C. 456 parts of bisphenol A are then added and the batch is reheated to 180° C. in the course of 30 minutes, and kept at this temperature for 2 hours. It is then cooled to 130° C. and diluted with 685 parts of isobutanol. The solids content is 65.5%.

Preparation of component ($a_2$) (II):

410.0 parts of component (B) (a reaction product of epoxy resin and Cardanol) and 164.0 parts of bisphenol A are heated for 2 hours at 160° C. 63.0 parts of hexamethylene diisocyanate are then added dropwise at 100° C. and stirring is continued for 1 hour at the same temperature. The resin is diluted to a solids content of 70% with 316.0 parts of isobutanol.

Preparation of component (B):

390 parts of a diglycidyl ether based on bisphenol A (epoxide value 0.5) and 210.0 parts of Cardanol are heated for 3 hours at 160° C. under nitrogen. 63.0 parts of hexamethylene diisocyanate are then added dropwise at 100° C. and stirring is continued for 1 hour. After dilution with 115.0 parts of isobutanol, a clear resin (epoxide value 0.15, based on solid resin) having a solids content of about 80% is obtained.

EXAMPLE 1

Electrocoating binder 140.0 parts of diethanolamine, 54.0 parts of di-n-butylamine, 74.5 parts of di-n-hexylamine, 191.0 parts of component ($a_2$) (I), 187.5 parts of bisphenol A and 69 parts of paraformaldehyde in 98 parts of isobutanol are heated for 3 hours at 80° C. 150.0 parts of a diglycidyl ether based on bisphenol A (epoxide value 0.20), 82.0 parts of a diglycidyl ether based on pentaerythritol (epoxide value 0.57–0.6) and 60.0 parts of isobutanol are then added and the mixture is kept at 70° C. for 5 hours. The clear binder has a solids content of 72%. To prepare 1.4 liters of a surface-coating bath, 194.0 parts of binder and 2.1 parts of glacial acetic acid are diluted with water (pH of the bath: 8.35). After stirring at 30° C. for 24 hours to remove low-boiling solvents, zincphosphatized steel sheet which has been rinsed with water and air-dried is coated for 2 minutes at 210V/30° C. and then baked for 20 minutes at 190° C. The coatings, 15 μm thick, were subjected to the salt spray test according to DIN 50,021 and gave values of from 5.5 to 8 mm after 10 days.

Comparable coatings prepared similarly in accordance with German Pat. No. 2,419,179, Example 5, gave values of >10 mm.

EXAMPLE 2

Electrocoating binder 130.0 parts of diethanolamine, 107.5 parts of di-n-butylamine, 187.5 parts of bisphenol A, 72.5 parts of paraformaldehyde and 160 parts of ethylglycol are heated for 3 hours at 80° C. 450.0 parts of component (B) and 140.0 parts of an epoxide resin containing urethane groups (in the form of a 77% strength solution in isobutanol, as described in German Laid-Open Application DOS No. 2,541,801, Example B a) are then added and the mixture is reacted for 5 hours at 70° C. The pale-colored, clear resin has a solids content of about 70%. 1 liter of a 10% strength electro coating bath is obtained by diluting 143.0 parts of the binder and 1.2 parts of glacial acetic acid with water (pH of the bath 8.6). After electrophoretic coating at 200V/25° C., and baking at 180° C. for 20 minutes, smooth 14–17 μm thick coatings are obtained.

EXAMPLE 3

Electrocoating finish

A 2 liter coating bath is prepared from 207.0 parts of the binder obtained as described in Example 2, 18 parts of a polybutadiene oil (mean molecular weight 1,450, iodine number about 450) and 1.7 parts of glacial acetic acid. The binder combination is mixed thoroughly, 262.0 parts of a milled pigment formulation obtained from 80.0 parts of the binder prepared as described in Example 2, 28.0 parts of china clay, 14.0 parts of talc, 5 parts of carbon black, 0.30 part of glacial acetic acid and 150 parts of water are added, and the batch is poured into water and dispersed therein. The pH of the bath is 8.45.

Coatings on horizontally arranged workpieces (L-shaped metal sheets), deposited at 150–200V/25° C., have an excellent appearance.

We claim:

1. A surface-coating binder which is substantially free from epoxide groups and is based on a reaction product of (A) from 25 to 90 percent by weight of a Mannich base obtained from
   (a₁) one or more polyhydric phenols which are free from ether groups and contain two or more aromatic rings, and/or
   (a₂) one or more monohydric or polyhydric phenols which contain one or more ether groups and contain two or more aromatic rings, and
   (b₁) one or more secondary amines which contain one or two hydroxyalkyl groups, or a mixture of (b₁) with
   (b₂) a secondary dialkylamine or dialkoxyalkylamine, and
   (c) formaldehyde or a formaldehyde donor,
and (B) from 75 to 10 percent by weight of one or more epoxy resins, wherein the reaction product of (A) and (B) additionally contains, built into its chemical structure, an olefinically unsaturated alkylphenol of the general formula (I)

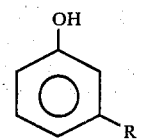

where R is a radical of 11 to 19 carbon atoms which contains from one to three carbon-carbon double bonds.

2. A surface-coating binder as claimed in claim 1, wherein the olefinically unsaturated alkylphenol of the general formula (I)

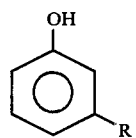

is Cardanol.

3. A surface-coating binder as claimed in claim 1, wherein component (a₁) is a condensation product, containing two phenolic hydroxyl groups, of a phenol and an olefinically unsaturated alkylphenol of the formula (I).

4. A surface-coating binder as claimed in claim 1, wherein component (a₂) is a reaction product of an epoxy resin, an olefinically unsaturated alkylphenol of the formula (I), bisphenol A and an aliphatic or aromatic diisocyanate which may or may not be partially blocked.

5. A surface-coating binder as claimed in claim 1, wherein component (B) is a reaction product, containing epoxide groups, of an epoxy resin and an olefinically unsaturated alkylphenol of the formula (I).

6. A surface-coating binder as claimed in claim 1, wherein component (B) is a reaction product, containing epoxide groups and isocyanate groups which may or may not be blocked, of an epoxy resin, an olefinically unsaturated alkylphenol of the formula (I) and a partially blocked diisocyanate or polyisocyanate.

7. A surface-coating binder with phenolic end groups as claimed in claim 1, wherein the binder contains from 0.5 to 50% by weight of an olefinically unsaturated alkylphenol of the formula (I).

8. A surface-coating binder as claimed in claim 1, wherein, for the synthesis of the Mannich base (A), the molar ratio of components (a₁)+(a₂) to components (b₁)+(b₂) is from 1:0.75 to 1:3 and at least one mole of formaldehyde is employed per mole of secondary amine.

9. A surface-coating binder as claimed in claim 1, wherein the Mannich base (A) and the epoxy resin (B) are reacted with one another in such amounts as to provide from 0.1 to 0.9 epoxide group of component (B) per phenolic hydroxyl group of component (A).

10. A surface-coating binder as claimed in claim 1, which is protonized with an acid and is used for the cathodic electrocoating of metal articles.

11. A surface-coating binder as claimed in claim 2, which is protonized with an acid and is used for the cathodic electrocoating of metal articles.

12. A surface-coating binder as claimed in claim 3, which is protonized with an acid and is used for the cathodic electrocoating of metal articles.

13. A surface-coating binder as claimed in claim 4, which is protonized with an acid and is used for the cathodic electrocoating of metal articles.

14. A surface-coating binder as claimed in claim 5, which is protonized with an acid and is used for the cathodic electrocoating of metal articles.

15. A surface-coating binder as claimed in claim 6, which is protonized with an acid and is used for the cathodic electrocoating of metal articles.

16. A surface-coating binder as claimed in claim 7, which is protonized with an acid and is used for the cathodic electrocoating of metal articles.

* * * * *